(12) United States Patent
Bohle et al.

(10) Patent No.: US 8,091,094 B2
(45) Date of Patent: Jan. 3, 2012

(54) METHODS AND SYSTEMS FOR AMBISTATEFUL BACKEND CONTROL

(75) Inventors: Holger Bohle, Dielhelm (DE); Jens Boeckenhauer, Wiesloch (DE)

(73) Assignee: SAP AG, Walldorf (DE)

(*) Notice: Subject to any disclaimer, the term of this patent is extended or adjusted under 35 U.S.C. 154(b) by 973 days.

(21) Appl. No.: 11/907,189

(22) Filed: Oct. 10, 2007

(65) Prior Publication Data

US 2009/0100443 A1 Apr. 16, 2009

(51) Int. Cl.
*G06F 13/00* (2006.01)
(52) U.S. Cl. ........................................ 719/320; 719/330
(58) Field of Classification Search .................. 719/320, 719/330
See application file for complete search history.

(56) References Cited

U.S. PATENT DOCUMENTS

| | | |
|---|---|---|
| 5,809,527 A | 9/1998 | Cooper et al. |
| 5,832,508 A | 11/1998 | Sherman et al. |
| 5,835,764 A | 11/1998 | Platt et al. |
| 5,850,548 A | 12/1998 | Williams |
| 5,870,727 A | 2/1999 | St. Jacques et al. |
| 6,023,706 A | 2/2000 | Schmuck et al. |
| 6,101,508 A | 8/2000 | Wolff |
| 6,158,044 A | 12/2000 | Tibbetts |
| 6,272,675 B1 | 8/2001 | Schrab et al. |
| 6,298,478 B1 | 10/2001 | Nally et al. |
| 6,550,057 B1 | 4/2003 | Bowman-Amuah |
| 6,640,238 B1 | 10/2003 | Bowman-Amuah |
| 6,697,880 B1 | 2/2004 | Dougherty |
| 6,721,739 B1 | 4/2004 | Mende et al. |
| 6,856,995 B1 * | 2/2005 | Ibitayo et al. .................. 717/116 |
| 6,901,554 B1 | 5/2005 | Bahrs et al. |
| 6,987,838 B2 | 1/2006 | Winterbottom |
| 7,007,278 B2 * | 2/2006 | Gungabeesoon ............. 719/311 |
| 7,020,880 B2 | 3/2006 | Mellen-Garnett et al. |
| 7,027,408 B2 | 4/2006 | Nabkel et al. |
| 7,028,221 B2 | 4/2006 | Holland et al. |
| 7,031,320 B2 | 4/2006 | Choe |
| 7,036,043 B2 | 4/2006 | Martin et al. |
| 7,036,128 B1 | 4/2006 | Julia et al. |
| 7,051,071 B2 | 5/2006 | Stewart et al. |
| 7,222,148 B2 | 5/2007 | Potter et al. |
| 7,412,709 B2 | 8/2008 | Branson et al. |
| 7,694,272 B2 | 4/2010 | Bronicki et al. |
| 2003/0121027 A1 | 6/2003 | Hines |
| 2003/0145305 A1 | 7/2003 | Ruggier |
| 2003/0204534 A1 | 10/2003 | Hopeman et al. |
| 2004/0107414 A1 | 6/2004 | Bronicki et al. |
| 2004/0128648 A1 | 7/2004 | Rappoport et al. |
| 2004/0133607 A1 | 7/2004 | Miloushev et al. |
| 2004/0167932 A1 | 8/2004 | Edmonds |

(Continued)

OTHER PUBLICATIONS

U.S. Appl. No. 11/411,463, filed Apr. 25, 2006, entitled "Mapping a New User Interface Onto an Existing Integrated Interface."

(Continued)

*Primary Examiner* — Andy Ho
(74) *Attorney, Agent, or Firm* — Finnegan, Henderson, Farabow, Garrett & Dunner LLP (57) ABSTRACT

Methods, computer-readable media, and systems control a backend. In one implementation, a method controls a backend by executing, at the backend, at least one command. The method may determine, by applying a set of ambistateful criteria, whether to place the backend under stateless control or stateful control, upon completion of executing the at least one command.

25 Claims, 8 Drawing Sheets

U.S. PATENT DOCUMENTS

| | | |
|---|---|---|
| 2004/0189439 A1 | 9/2004 | Cansino |
| 2005/0038834 A1 | 2/2005 | Souder et al. |
| 2005/0044197 A1* | 2/2005 | Lai .............................. 709/223 |
| 2005/0050551 A1 | 3/2005 | Sparago et al. |
| 2005/0120385 A1* | 6/2005 | Stalker ......................... 725/134 |
| 2005/0144174 A1 | 6/2005 | Pesenson et al. |
| 2005/0203764 A1 | 9/2005 | Sundararajan et al. |
| 2005/0246389 A1 | 11/2005 | Shah et al. |
| 2006/0059205 A1 | 3/2006 | Shah et al. |
| 2006/0101081 A1 | 5/2006 | Lin et al. |
| 2006/0136833 A1 | 6/2006 | Dettinger et al. |
| 2006/0187901 A1* | 8/2006 | Cortes et al. .................. 370/352 |
| 2006/0206567 A1 | 9/2006 | Milligan et al. |
| 2007/0168907 A1 | 7/2007 | Ibarra et al. |
| 2007/0168974 A1 | 7/2007 | Mockford |
| 2007/0219999 A1 | 9/2007 | Richey et al. |
| 2007/0288890 A1 | 12/2007 | Wells |
| 2008/0189769 A1* | 8/2008 | Casado et al. .................... 726/4 |
| 2008/0235610 A1 | 9/2008 | Dettinger et al. |
| 2009/0164571 A1 | 6/2009 | Potter et al. |

OTHER PUBLICATIONS

U.S. Appl. No. 11/606,441, filed Nov. 29, 2006, entitled "Methods and System for Data Preparation and Communication between Software Applications."

U.S. Appl. No. 11/540,266, filed Sep. 28, 2006, entitled "Method and System for Providing Locking Behavior."

U.S. Appl. No. 11/540,267, filed Sep. 28, 2006, entitled "System and Method for Extending Legacy Applications with Undo/Redo Functionality."

* cited by examiner

METHODS AND SYSTEMS FOR AMBISTATEFUL BACKEND CONTROL

TECHNICAL FIELD

The present invention generally relates to the field of software and communications between software applications in a system or computing environment. More particularly, the invention relates to ambistateful backend control and to enabling a new application to reuse existing functionality of one or more legacy applications through communication between the new application and the one or more legacy applications.

BACKGROUND

Generally speaking, legacy applications include functionality that has been developed, tested, and/or improved over time. Such functionality is often completely integrated with a user interface. Although a legacy application may become outdated for one or more reason, it often implements or otherwise includes functionality that is still useful. Therefore, in order to reuse the existing functionality of a legacy application, a new application may need to be built on top of the legacy application's user interface.

System environments where this approach is needed usually comprises a frontend, a backend, and a controller. The backend may incorporate one or more legacy applications. The legacy application is any application whose existing functionality is being reused by a new application. The new application is any application that is reusing existing functionality of a different application. A controller facilitates communication between the legacy and the new application. The controller may be a separate application or part of the new application. The frontend comprises a user interface of the new application. A user enters input into the frontend. The input comprises of a trigger action and input data. The trigger action is a command that the user wants to execute. The controller maps the input to a set of commands enriched with input data. The set of commands enriched with input data is called an action script. The controller executes the action script at the backend to execute the command that the user wants to execute.

One approach for reusing existing functionality of a legacy application is to build a new application on top of the legacy application's user interface. Communication between the new application and the legacy application is realized by using stateless control of the backend (legacy application). Stateless control is when the legacy application is launched before the controller executes any action scripts at the backend. In other words, the backend is not kept running after an action script is executed at the backend and before a new action script is executed. However, a drawback of this approach is that stateless control forces the re-execution of all the action scripts generated up until that point every time an input is entered at the frontend that requires the functionality of the backend. Such repetition worsens performance with each user interaction that requires the functionality of a legacy application. Performance is further negatively affected if there is a costly initial load that needs to be multiply repeated.

An alternative approach for reusing existing functionality of a legacy application is to build a new application on top of the legacy application's user interface where the communication between the new application and the legacy application is realized by using stateful control of the backend. Stateful control is when the backend is kept running after it is launched the first time (after the execution of the first action script on the backend). A drawback of this approach is that simple implementation of features like undo/redo becomes much more complicated. Another drawback of this approach is that the system load can not be released, when the functionality of the backend is not being used, by dismissing the backend.

In view of the foregoing, there is a need for an improved solution for reusing the functionality of legacy applications. In particular, there is a need for systems and methods for ambistateful control, where the functionality of one or more legacy applications can be used in a new application. Specifically, improved solutions need to allow the new application to use the functionality of a legacy application without having to re-execute the entire action history in the backend upon each action executed in the frontend. At the same time, the solution needs to provide the ability to dismiss the backend even if it might be used later, if appropriate.

SUMMARY

The present invention provides methods, computer-readable media, and systems for using existing functionality of a legacy application. This is achieved by providing the ability to alternate between stateful and stateless backend control based on a set of ambistateful criteria.

In one exemplary embodiment, a method is provided including, for example, receiving input at a frontend, the input comprising at least trigger action, and the frontend comprising a user interface of the first application; transmitting the input from the frontend to a controller; mapping, at the controller, the input to an action script comprising a set of commands corresponding to the input, the action script being executable at a backend, wherein the backend comprises a user interface of the second application; executing, at the backend, at least one action script based on the mapping at the controller; and receiving, at the controller, field values and messages displayed at the backend; and determining, by applying a set of ambistateful criteria at the controller, whether to place the backend under stateless control or stateful control, upon completion of executing the at least one action script.

In one alternate embodiment, the controller may dynamically switch between stateful or stateless control of the backend. In another alternate embodiment, input may comprise only a trigger action, or a trigger action and input data. In another alternate embodiment, the controller stores the input. In another alternate embodiment, the controller may add the action script to an action script stack.

In another alternate embodiment, if the input comprises an undo trigger action, the method may further comprise: dismissing the backend if it is under stateful control; removing a last action script added to the action script stack that is not in a redo stack from the action script stack; adding the last action script added to the action script stack that is not in the redo stack to a redo stack, and executing action scripts in the action script stack in a sequence they were added. And if the input comprises a redo trigger action and the redo stack has at least one action script, the method may further comprise: dismissing the backend if it is in stateful control; removing a last action script added to the redo stack that is not in the action script stack from the redo stack; adding the last action script added to the redo stack that is not in the action script stack to the action script stack; and executing the action scripts in the action script stack in the sequence they were added. In another alternate embodiment, alternatively if the input comprises a redo trigger action, the redo stack has at least one action script, and the backend is in stateful control, the method may further comprise: removing a last action script added to the redo stack that is not in the action script stack from the redo stack; adding the last action script added to the redo stack that is not in the action script stack to the action script stack, and executing the last action script added to the action script stack.

In another alternate embodiment, the set of ambistateful criteria comprises criteria to determine a backend control state based on configuration data. In another alternate embodiment, the set of ambistateful criteria may comprise criteria to determine a backend state based runtime optimization. In another alternate embodiment, the set of ambistateful criteria may comprise criteria that favor placing backend under stateless control in at least one of the following circumstances: input comprises an undo trigger action; input comprises a start-over trigger action; or backend service may be released early. In another alternate embodiment, the set of ambistateful criteria may comprise criteria that favor placing backend under stateful control in at least one of the following circumstances: costly initial load; navigation to previous states is necessary; a data change is detected in a persistency layer; or no user input is made for previous backend screens. In another alternate embodiment, if the data change is detected in the persistency layer, then the backend may only remain under stateful control.

In another alternate embodiment, the backend may comprise of more then one backend screens. In such an alternate embodiment if the backend screens possess navigation commands leading to a navigation between the screens without changing the context, and it is necessary to avoid a restart, the method may further comprise: connecting the navigation commands to a closed sequence loop over all the backend screens assigned to a frontend state; assigning special loop actions to the frontend state; and using the special loop actions when the frontend receives certain input. In another alternate embodiment, the controller may detect input involving a left backend screen at runtime. The method may further comprise: executing a special loop action; and inserting the data input for each backend screen during the loop action In another alternate embodiment, the method may further comprise identifying a backend screen reached by the controller. In another alternate embodiment, the method may further comprise receiving at the controller field values and messages displayed at the backend.

In another alternate embodiment, the set of commands may be assigned for each trigger action at design time. In another alternate embodiment the action script may comprise the set of commands enriched with input data.

In another exemplary embodiment, a system is provided including, for example: a frontend for receiving input, the input comprising at least a trigger action, wherein the frontend comprising a user interface of the first application; a backend for executing at least one action script; and a controller for handling communication between the frontend and the backend; wherein the controller maps the input to an action script, wherein the action script comprises a set of commands corresponding to the input, the action script being executable at the backend; and wherein the controller determines, by applying a set of ambistateful criteria, whether to place backend under stateful control or stateless control, upon completion of executing at least one action script.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate embodiments and aspects of the present invention. In the drawings.

DESCRIPTION OF THE EMBODIMENTS

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Figure 1:
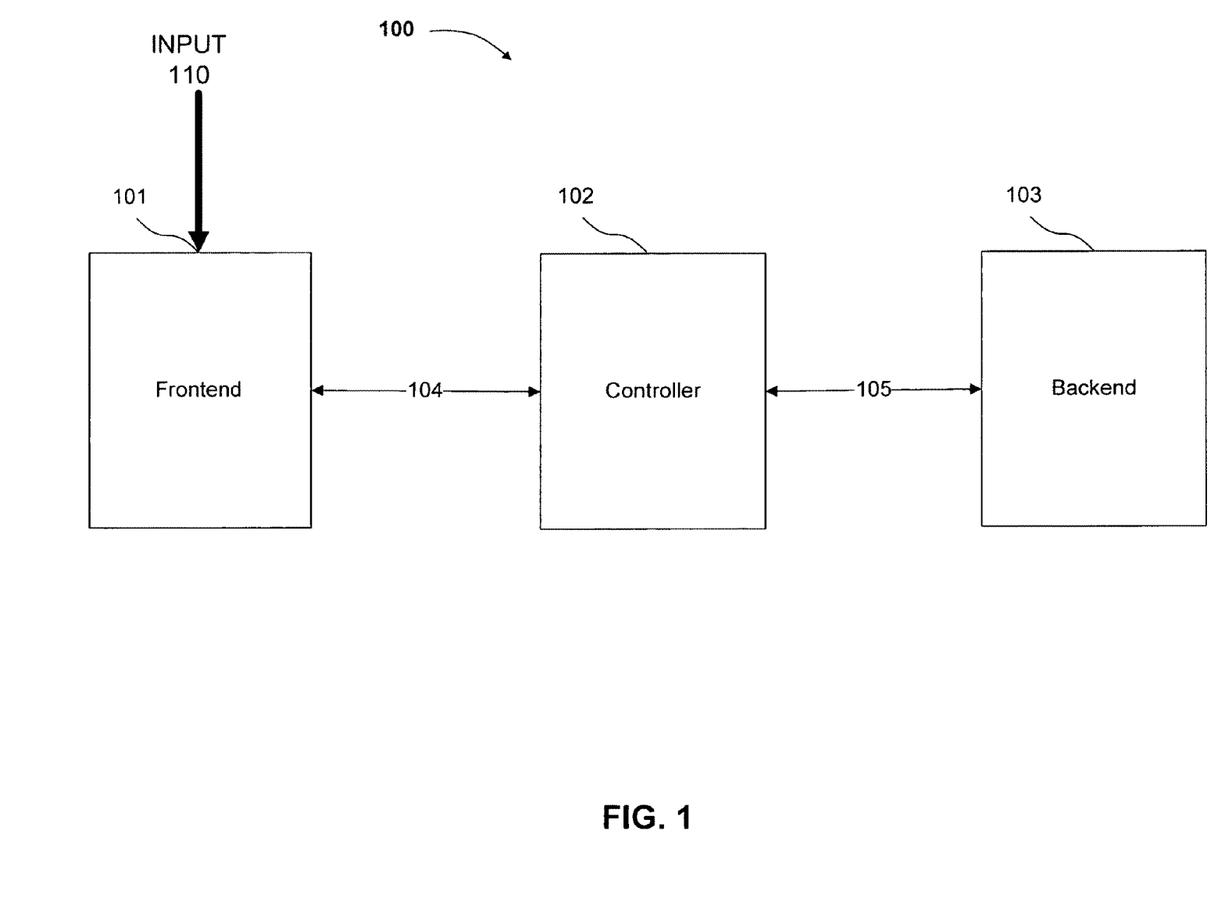
FIG. 1 is a block diagram illustrating the components of an exemplary system, consistent with an embodiment of the present invention.

FIG. 1 illustrates components of an exemplary system 100, consistent with an embodiment of the present invention. The three main components of the system are a frontend 101, a controller 102, and a backend 103. The three components may be executed by the same or different computer systems. Examples of such computer systems include personal computers, servers, and handheld computers. The components may communicate with each over a communication medium 104, 105. The communication medium 104, 105 may be either inside a computer system, intranet, internet, etc. The frontend 101 may be a user interface that receives input 110 from a user, a different controller, etc. The frontend 101 may transmit input 110 to the controller 102 through the communication medium 104. The frontend 101 may execute the controller 102 or the controller may be executed at the same time as the frontend.

The controller 102 may be an application executed on either the same computer system as the frontend 101 or on a remote computer system. The controller 102 may execute the backend under stateful control 600 or stateless control 500. The backend 103 may also be launched independently of, in parallel to, the controller. The controller 102 may execute an action script at the backend 103 through a communication medium 105. In a possible embodiment, the action script may include a set of commands that correspond to the trigger action received at the frontend 101, enriched with input data received at the frontend 101.

The backend 103 may be a legacy user interface that is either on a remote computer system, or on the same computer system as either the controller 102, the frontend 101, or both. The backend 103 may also be on multiple remote computer systems and may include different software applications, each with a different user interface. Or the backend 103 may be a single software application that may have multiple screens (user interfaces) associated with it at one time during run time.

Figure 2:
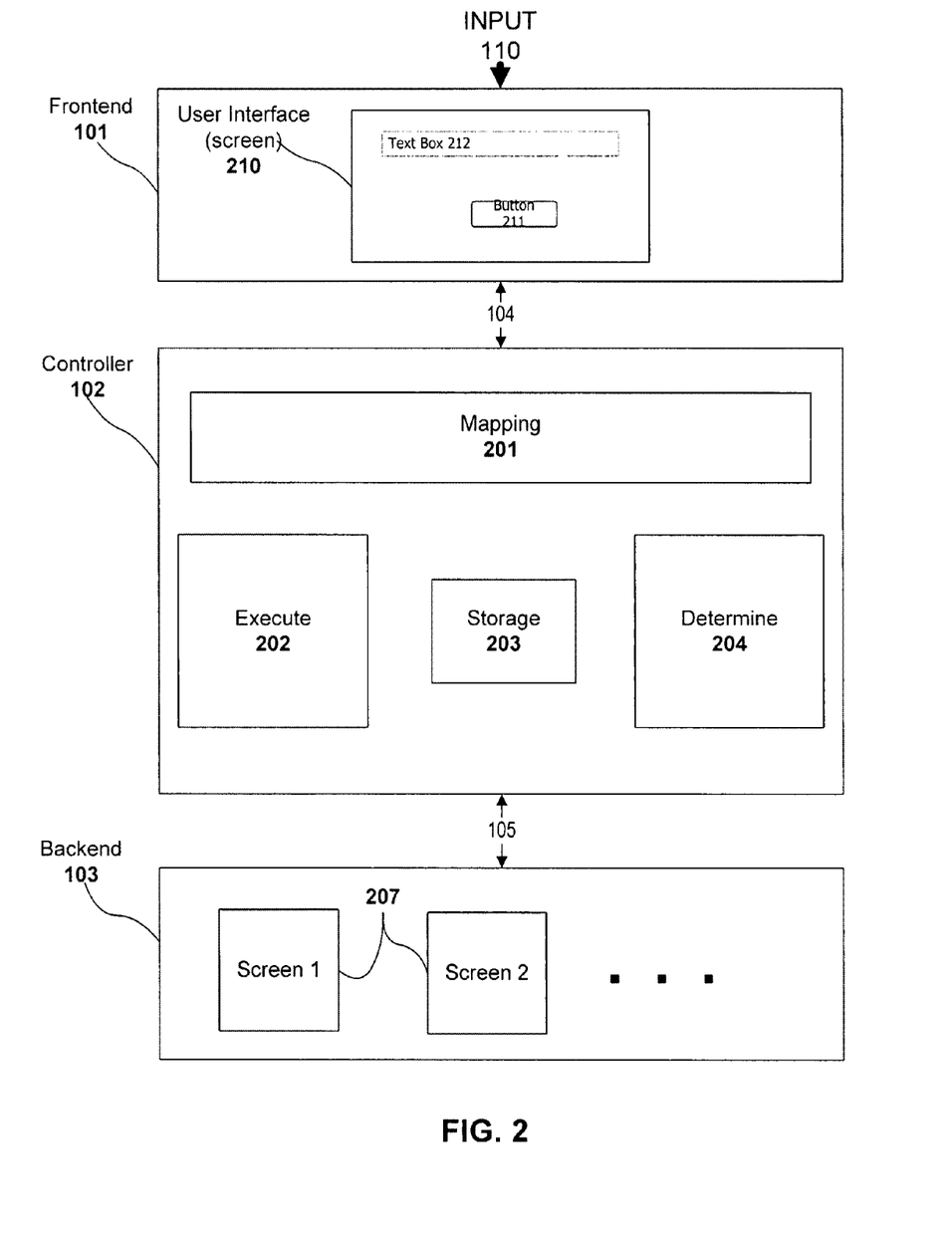
FIG. 2 is a block diagram illustrating an example of a system, consistent with an embodiment of the exemplary system illustrated in FIG. 1.

FIG. 2 is an example of a system that is consistent with an embodiment of the exemplary system illustrated in FIG. 1. In this example, the frontend 101 receives input 110. The frontend 101 comprises one or more screens and/or various input devices. In this example, there is field 212 for a user to enter data and a button 211 for a user to trigger an action. The input 110 is transmitted from a frontend 101 to a controller over a communication medium 104. The controller 102, in this example, includes four main components: mapping component 201, execute component 202, storage component 203, and determine component 204.

The mapping component 201 may translate the input 110 received by the frontend 101 into a set of corresponding commands to execute at the backend 103. The set of corresponding commands along with any input data, passed from the frontend 101 and used to execute the corresponding commands at the backend 103, may be organized by the mapping component 201 into an action script. A single action script may correspond to a single input at a frontend 101.

The storage component 203 may stores the action scripts generated by the mapping component in an Action Script Stack. The storage component 203 may also store the input. The Action Script Stack is not limited to a stack data structure.

The Execute component 202 may execute one or more action scripts generated by the mapping component 201 at the backend 103. The Execute component 202 may also initialize and/or execute the backend 103.

Finally, the determine component 204 may determine whether the backend 103 or its individuals screens should be placed under stateful control, continue running without interruption, be placed under stateless control, or be dismissed.

The backend 103, as mentioned above, may include one or more separate user interface screens 207.

Figure 3:
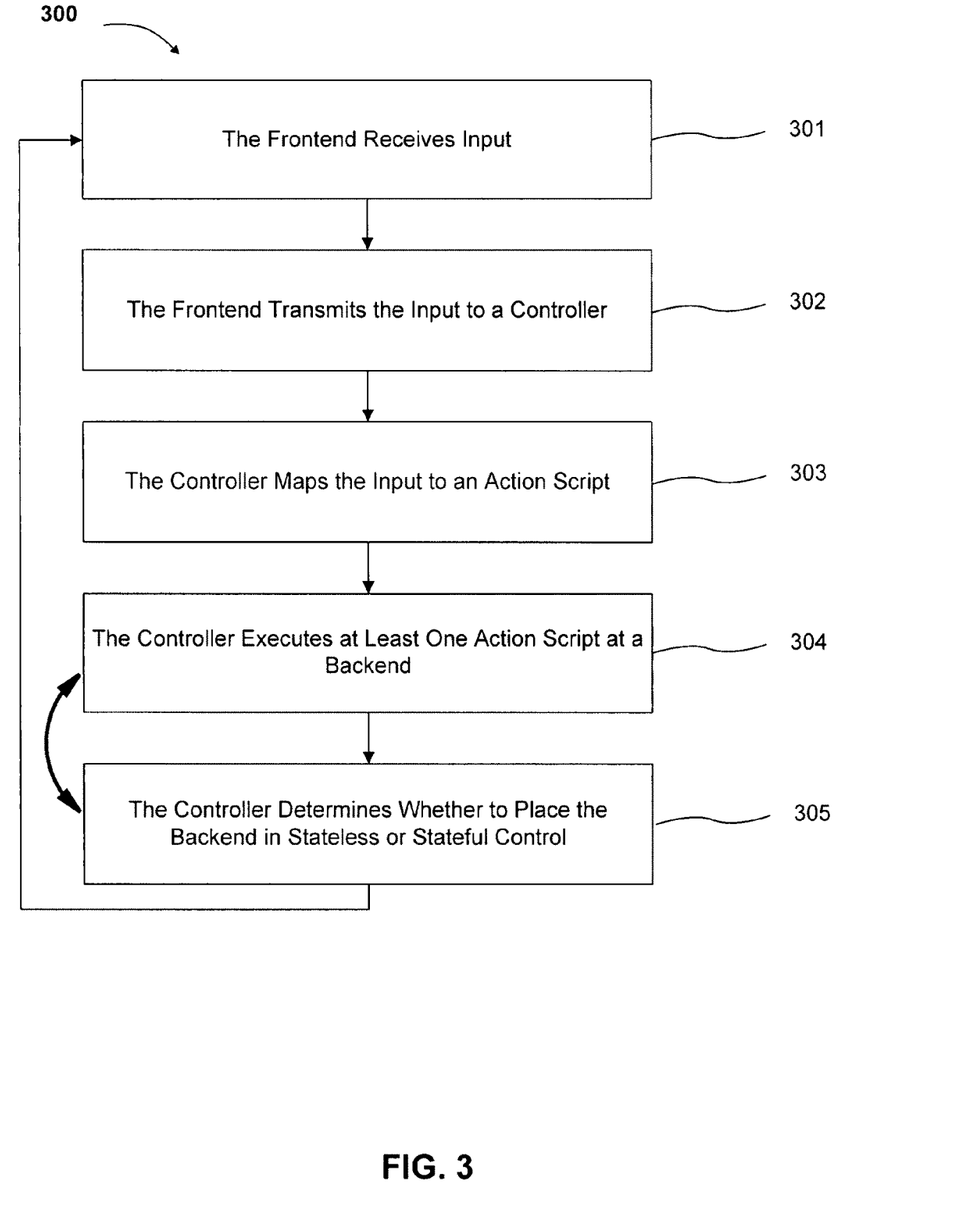
FIG. 3 is a flowchart of an exemplary method, consistent with an embodiment of the present invention.

FIG. 3 is a flowchart of an exemplary method 300, consistent with an embodiment of the present invention. Method 300 may be executed on a system illustrated in FIG. 2. According to the method, at step 301, the frontend 101 may receive input 110. Receiving the input 110 at the frontend 101 may include a user entering input data into various input fields 212 and triggering an action by clicking a button 211. Alternatively, input 110 may be automatically transmitted to frontend 101.

At step 302, the frontend 101 may transmit the input 110 to the controller 102 through a communication channel 104. At step 303, the controller 102 may map the input received using a mapping component 201 to an action script that corresponds to the input 110.

Steps 304 and 305 may be performed in no particular order following step 303. At step 304, the controller 102 may execute one or more action scripts, generated by mapping 303 at the backend 103. At step 305, the controller 102 may determine whether to place the backend 103 under stateless control (see FIG. 5) or stateful control (see FIG. 6) after step 304 is completed.

After the completion of the method 300, the state of the frontend 101 may be altered. The method may be repeated when a new input 110 is received by the frontend 101 that requires the backend 103 to perform certain commands.

Figure 4:
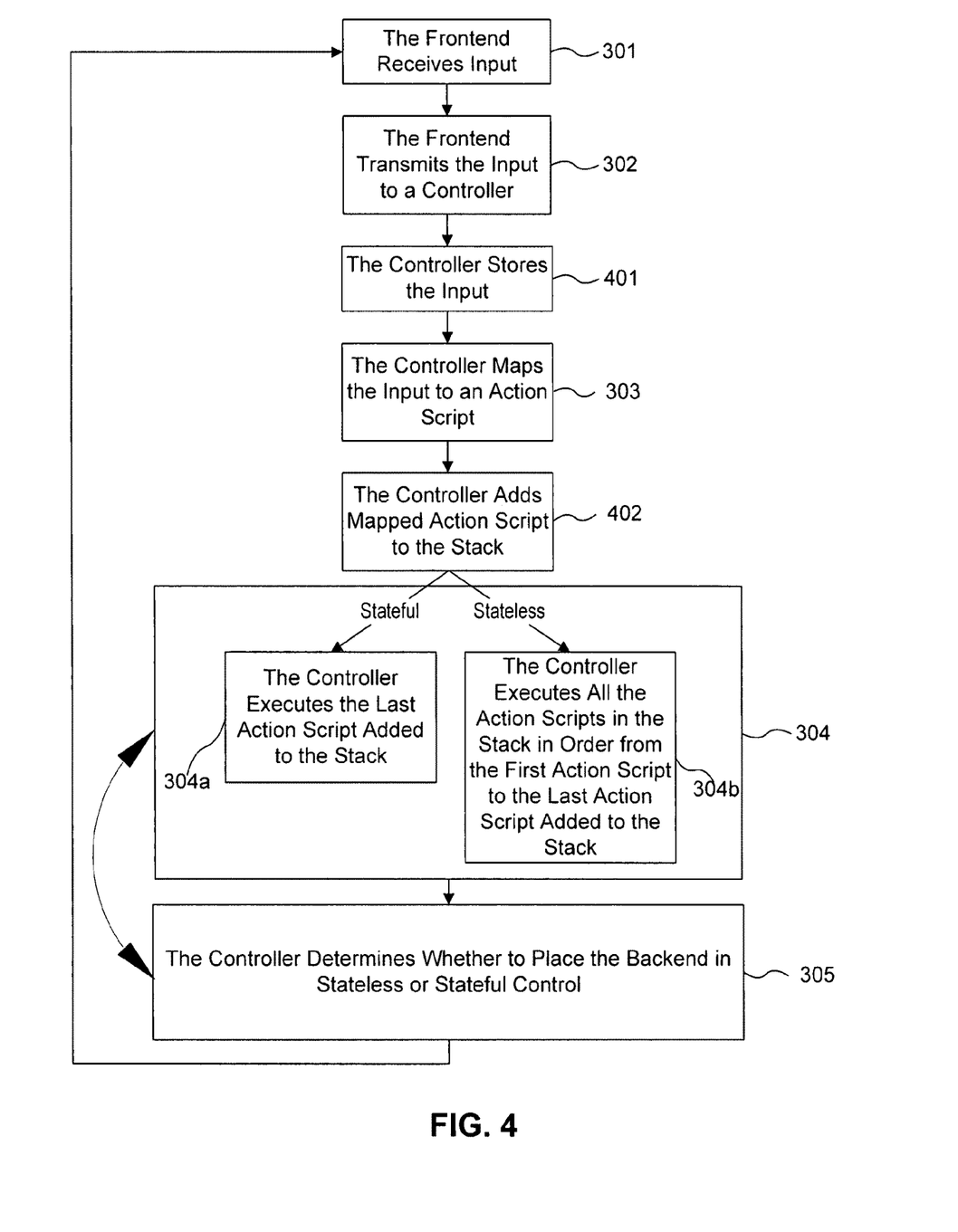
FIG. 4 is a flowchart of an exemplary method, consistent with an embodiment of the exemplary method depicted in FIG. 3.

FIG. 4 is a flowchart of an exemplary method, consistent with an embodiment of the present invention. One of ordinary skill in the art will recognize that the steps of the method may be performed in a different order. At step 301, the frontend 101 may receive input 110. At step 302, the input 110 may be transmitted from the frontend 101 to a controller 102.

In one embodiment, the controller 102 may store the input 110 after receiving it from the frontend 101. However, the controller 102 may also store the action script after it is generated by mapping the input 110 to an action script at step 303. At step 402, the action script may be added to an action script stack, which the controller may cause to be stored.

At step 304, the controller 102 may execute either the last action script added to the action script stack or the action scripts in the action script stack depending on the state of control of the backend 103. If the backend 103 is in stateful control, the controller 102 may execute the last action script generated and added to the stack at 304*a*. If the backend 103 is in stateless control, the controller 102 may execute all the action scripts in the action script stack in order from the first action script added to the action script stack to the last action script added to the action script stack.

At step 305, the controller 102 may determine whether to place backend 103 under stateless or stateful control after step 304. The controller 102 may make the determination based on a set of ambistateful criteria.

Figure 5:
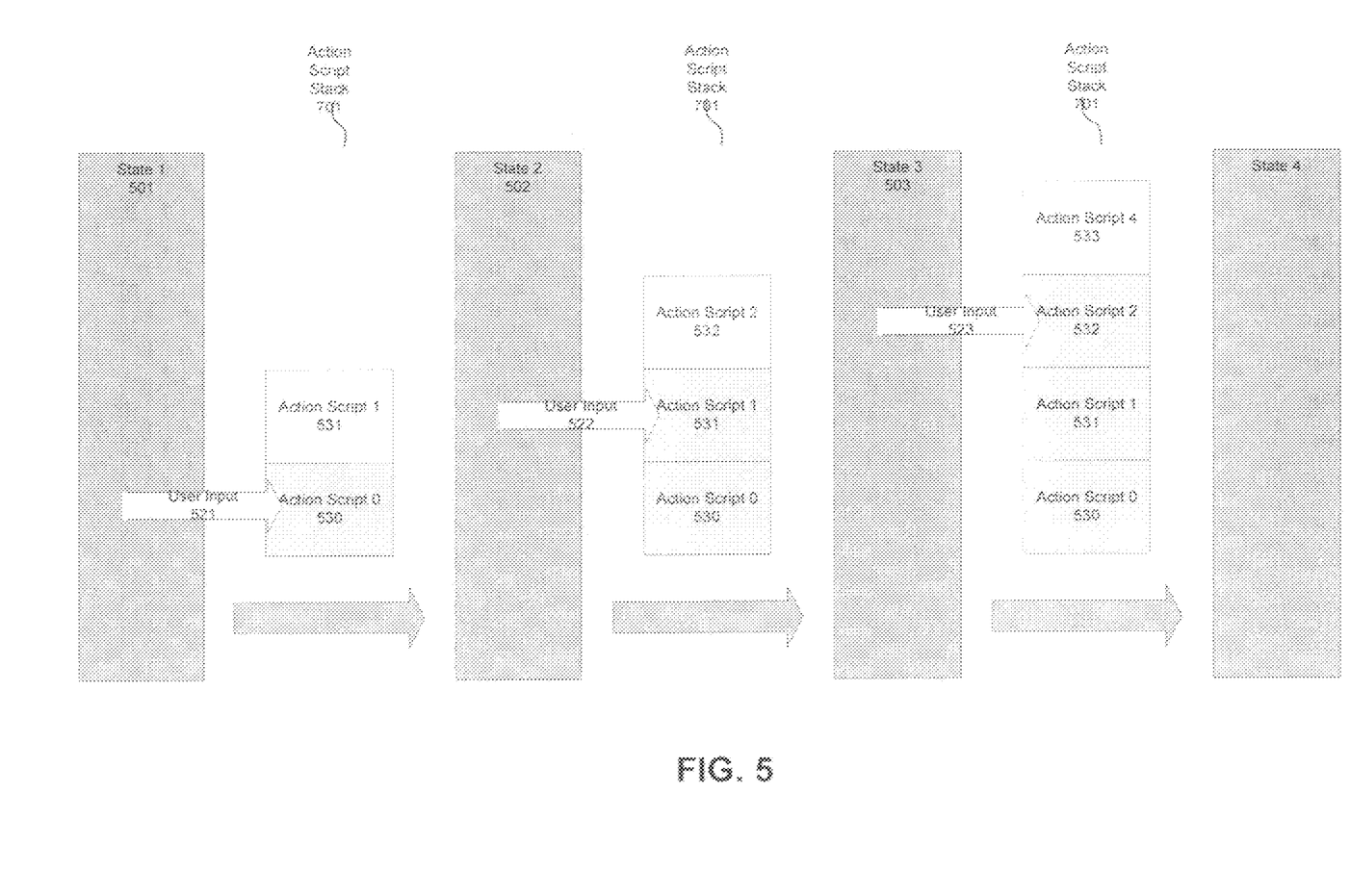
FIG. 5 depicts an example of a backend under stateless control.

FIG. 5 depicts an example where the backend 103 is under stateless control. In the example, the backend is initially in state 501. Then the backend state 501 is dismissed. Thereafter, the frontend 101 may receive input that is depicted by input 521. The input 521 may comprise a trigger action and data input. An action script 531, that corresponds to the input 521, may be generated. The action script 531 may comprise a set of commands that can be executed at the backend 103 corresponding to the trigger action received at the frontend 101, enriched with the input data. The action script 531 may be added to the action script stack 701. The controller 102 may then initialize the backend 103. The controller 102 may execute all the action scripts in the action script stack 701. The action scripts may be executed starting with the first action script added to the action script stack 530, and ending with the last action script added the action script stack 531. After action scripts 530 and 531 are executed, the backend 103 is in state 502 and then it is dismissed. The controller 102 may store all the action scripts 530, 531 generated for the backend 103 to reach state 502. If the user enters new input 522 into the frontend 101, a new action script 532 may be generated and added to the action script stack 701. Then the action scripts may be executed by the controller in order from action script 530, to action script 531 and finally the newly generated action script 532. After action script 532 is executed, the backend 103 ends up in state 503. The backend may repeat all the states 501, 502, and 503 before reaching a last state each time.

Figure 6:
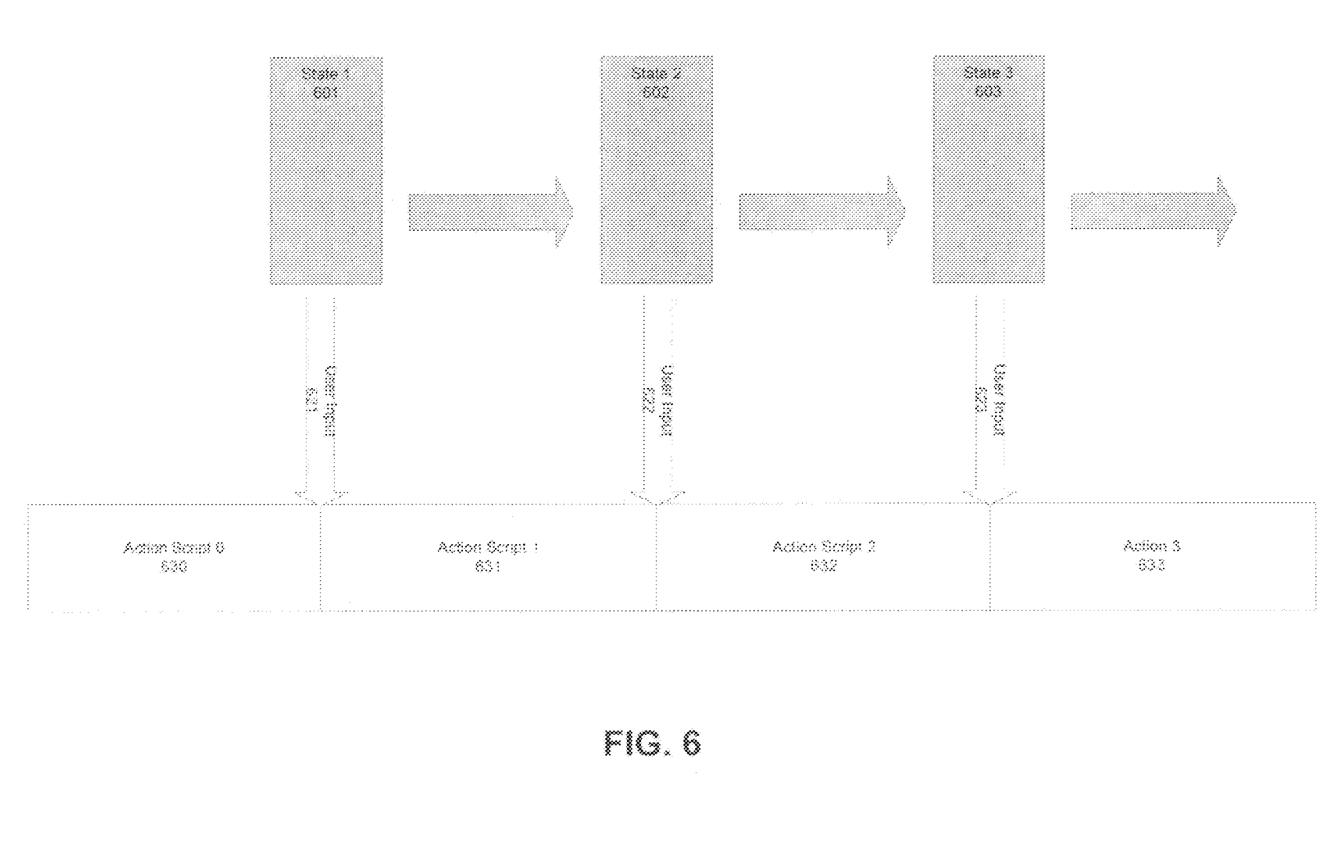
FIG. 6 depicts an example of a backend under stateful control.

FIG. 6 depicts an example where the backend is under stateful control. In the example, the backend 103 is in state 601 when the frontend 101 receives user input 621. The controller 102 may generate a new action script 631 corresponding to the newly received input 621. The backend 103 may not need to be initialized, since the backend is under stateful control and is therefore already running. The controller 101 may execute action script 631 at the backend 103. After action script 631 is executed, the backend is in state 602. The backend 103 may not be dismissed, since it is under stateful control, and the frontend 101 is ready to receive user input 622.

An example of an embodiment, where there is ambistateful control is now discussed in connection with FIG. 5. In one example, the backend 103 is in stateful control and is in state 1. The frontend 101 receives input 521. An action script 531, corresponding to user input 521, may be generated. The action script 531 may be added to the action script stack 701. The backend 103 may not need to be initialized since it is under stateful control and is already running. The controller 101 may execute action script 531 at the backend 103. Either before or after executing the action script 531, the controller 102 may determine whether to keep the backend 103 under stateful control or dismiss the backend 103 and keep it in stateless control after the action script is executed. The determination may be made by the controller 102 based on a set of ambistateful criteria.

If the controller 102 determined to keep the backend under stateful control in state 502, the backend 103 is not dismissed, and the frontend 101 is ready to receive new user input 522. When the frontend 101 receives user input 522, frontend 101 may transmit user input 522 to the controller 102. The controller 102 may generate action script 532 corresponding to the input 522. Again, the backend 103 may not need to be initialized since it is under stateful control, and is already running. The controller 101 may execute action script 531 at the backend 103. At this point, again, whether the backend 103 is dismissed or not may depend on a determination made by the controller 102.

However, if the controller 102 determined to dismiss the backend 103 in state 502 after executing action script 531, the backend 103 is dismissed. In this example, the frontend 101 receives new input 522. The controller 102 may generate an action script 532 corresponding to the input 522. The controller 102 may initialize the backend 103, since the backend 103 is under stateless control and was dismissed after the last action script was executed. The controller 102 may execute all the action scripts in the action script stack 701 starting with the first action script added to the action script stack 530, followed by action script 531 and ending with the last action script added to the action script stack 532. The backend 103 goes through state 501 and state 502, before reaching state 503 after the last action script 532 added to the action script stack 701 is executed. At this point, whether the backend 103 is dismissed or not depends may depend on a determination made by the controller 102.

Figure 7:
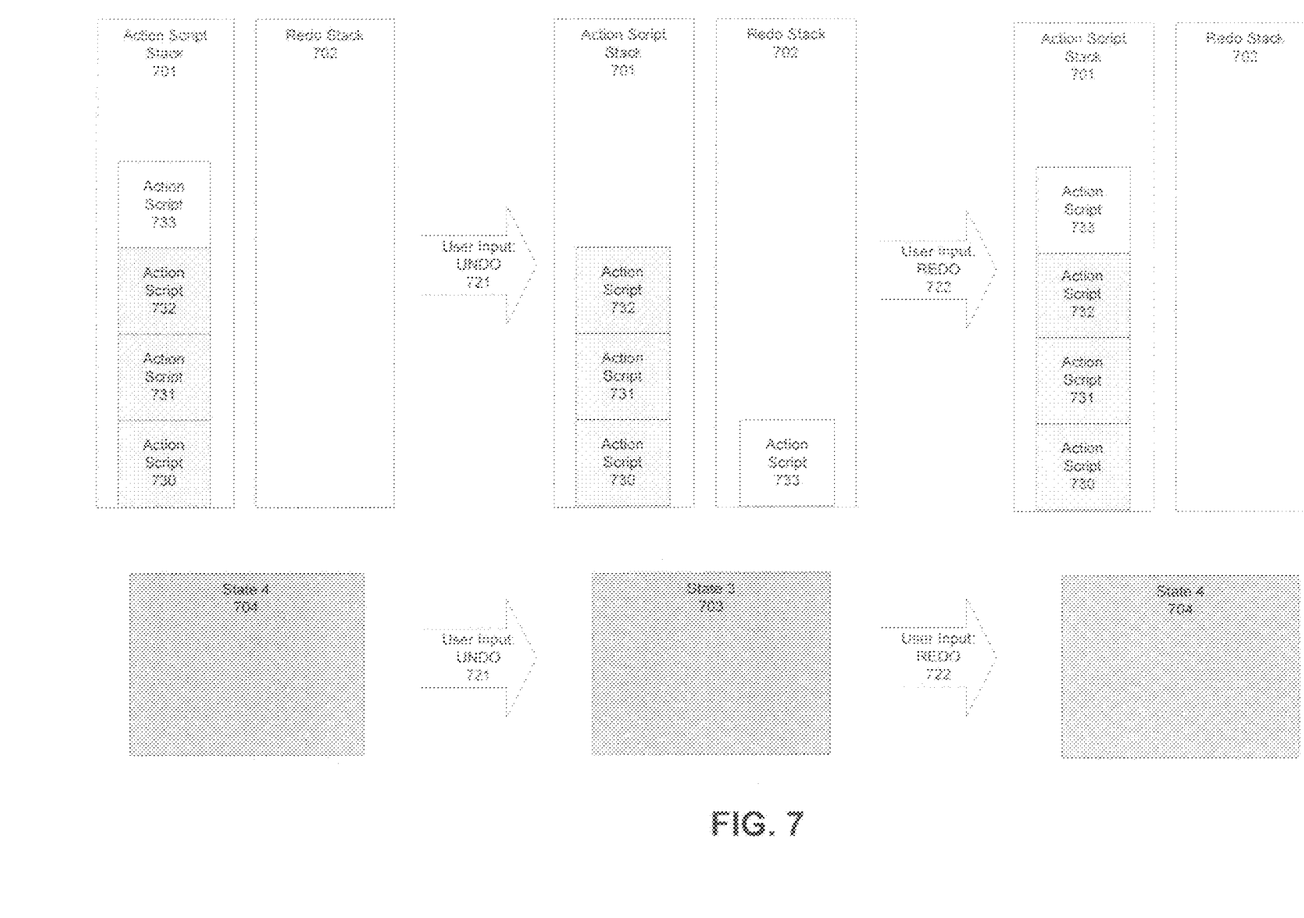
FIG. 7 depicts an action script stack in an example, consistent with an exemplary embodiment of the present invention, when an undo command is executed, followed by a redo command being executed.

FIG. 7 depicts an example of an embodiment of the present invention. In the example, an undo command is executed, followed by a redo command. At the start of this example, the frontend 101 already received at least four inputs, four action scripts, (i.e., 730, 731, 732, and 733) corresponding to the inputs were generated, and the actions scripts were added to the action script stack 701 in the order they were added to the action script stack. Thereafter, in the example, the frontend 101 receives input comprising of the UNDO trigger action 721. The backend 103, in state 704, is dismissed if the backend 103 is in stateful control. The controller 102 may remove the last action script 733 added to the action script stack 701, and place it in the redo stack 702. The controller 102 may execute all the action scripts 730, 731, and 732, in the order they were added to the action script stack 701, at the backend 103. After the action scripts are executed, the backend is in state 703, which it was in before being in state 704. At this point, whether the backend 103 is dismissed or not may depend on a determination made by the controller 102.

In this example, the frontend may receives input 722 comprising a redo trigger action. If the backend 103 was not dismissed, the controller 102 may remove the action script 733 that was the last action script added to the redo stack 702, add it to the action script stack 701, and execute the action script 733 at the backend 103. The backend is then in state 704. If the backend was dismissed, the controller 102 may remove the action script 733 that was the last action script added to the redo stack, add it to the action script stack 701, and execute the action scripts 730, 731, 732, and 733 (in this order) in the action script stack 701 at the backend 103. The backend 103 returns to state 704.

Figure 8:
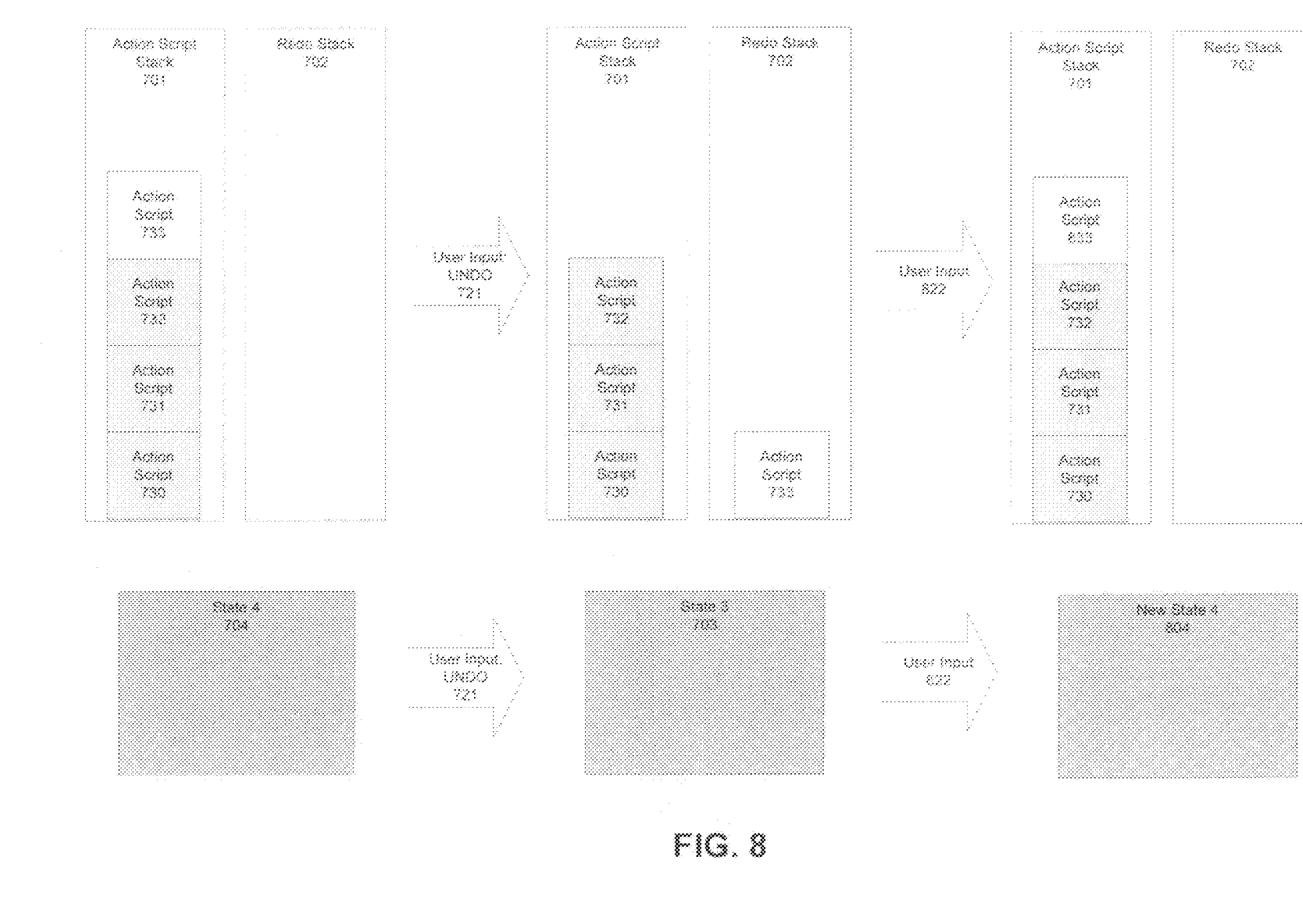
FIG. 8 depicts an action script stack in an example, consistent with an exemplary embodiment of the present invention, when an undo command is executed, followed by a new input that does not comprise a redo nor an undo trigger action.

FIG. 8 depicts an example of an embodiment of the present invention wherein an undo command is executed, followed by a new input. At the start of this example, the frontend 101 already received at least four inputs, four action scripts (i.e., 730, 731, 732, and 733) corresponding to the inputs were generated, and the actions scripts 730, 731, 732, and 733 were added to the action script stack 701 in the order they were generated. Thereafter, in the example, the frontend 101 may receive input comprising the UNDO trigger action 721. The backend 103, in state 704, is dismissed if the backend 103 is in stateful control. The controller 102 may remove the last action script 733 added to the action script stack 701, and place it in the redo stack 702. The controller 102 may execute the action scripts 730, 731, and 732, in the order they were added to the action script stack 701, at the backend 103. After the action scripts are executed, the backend 103 is in state 703, which it was in before being in state 704. At this point, whether the backend 103 is dismissed or not may depend on a determination made by the controller 102.

In this example, the frontend 101 may receive input 822 that does not comprise a redo or undo trigger action. The controller 102 may first empty the redo stack. Then controller 102 may generate a new action script 833 that corresponds to the user input 822. The new action script 833 may be added to the action script stack. If the backend 103 is in stateful control, the new action script 833 may be executed at the backend 103. If the backend 103 is under stateless control, the controller may execute all the action scripts 730, 731, 732, and 833 at the backend 103. The backend 103 reaches a new state 804.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for using functionality from a second application based on input from a first application, comprising:
    receiving input at a frontend, the input comprising at least a trigger action, wherein the frontend comprises a user interface of the first application;
    transmitting the input from the frontend to a controller;
    mapping, at the controller, the input to an action script comprising a set of commands corresponding to the input, the action script being executable at a backend, wherein the backend comprises a user interface of the second application;
    executing, at the backend, at least one action script based on the mapping at the controller; and
    determining, by applying a set of ambistateful criteria at the controller, whether to place the backend under stateless control or stateful control, upon completion of execution of the at least one action script.

2. The method according to claim 1, further comprising switching dynamically between stateful control or stateless control of the backend.

3. The method according to claim 1, wherein the action script comprises a set of commands enriched with input data.

4. The method according to claim 1, wherein the set of ambistateful criteria comprises criteria for determining a backend control state based on configuration data.

5. The method according to claim 1, wherein the set of ambistateful criteria comprises criteria for determining a backend state based runtime optimization.

6. The method according to claim 1, wherein the set of ambistateful criteria comprises criteria for placing the backend under stateless control in at least one of the following circumstances:
    the input comprises an undo trigger action;
    the input comprises a start-over trigger action; or
    the backend may be released early.

7. The method according to claim 1, wherein the set of ambistateful criteria comprises criteria for placing the backend under stateful control in at least one of the following circumstances:
    a costly initial load;
    navigation to previous states is necessary;
    a data change is detected in a persistency layer; or
    the input does not correspond to any commands to be executed at previous backend screens.

8. The method according to claim 7, wherein if the data change is detected in the persistency layer, the backend remains under stateful control.

9. A system for using functionality from a second application based on input from a first application, the system comprising:
    a frontend for receiving input, the input comprising at least a trigger action, wherein the frontend comprises a user interface of the first application;
    a backend for executing at least one action script; and
    a controller for handling communication between the frontend and the backend;
    wherein the controller maps the input to an action script, the action script comprises a set of commands corresponding to the input and the action script is executable at the backend; and
    wherein the controller determines, by applying a set of ambistateful criteria, whether to place the backend under stateful control or stateless control, upon completion of execution of at least one action script.

10. The system according to claim 9, wherein the controller can dynamically switch between stateful control or stateless control of the backend.

11. The system according to claim 9, wherein the action script comprises a set of commands enriched with input data.

12. The system according to claim 9, wherein the set of ambistateful criteria comprises criteria for determining a backend control state based on configuration data.

13. The system according to claim 9, wherein the set of ambistateful criteria comprises criteria for determining a backend control state based on a runtime optimization mechanism.

14. The system according to claim 9, wherein the set of ambistateful criteria comprises of criteria for placing the backend under stateless control in at least one of the following circumstances:
    the input comprises an undo trigger action;
    the input comprises a start-over trigger action; or
    the backend may be released early.

15. The system according to claim 9, wherein the set of ambistateful criteria comprises criteria for placing the backend under stateful control in at least one of the following circumstances:
    a costly initial load;
    navigation to previous states is necessary;
    a data change is detected in a persistency layer; or
    the input does not correspond to any commands to be executed at previous backend screens.

16. The system according to claim 15, wherein if the data change is detected in the persistency layer, the backend remains under stateful control.

17. A computer-readable media storing a program for causing a computer to perform a method for using in a first application existing functionality of a second application, the method comprising:
    receiving input at a frontend, the input comprising at least a trigger action, wherein the frontend comprises a user interface of the first application;
    transmitting the input from the frontend to a controller;
    mapping, at the controller, the input to an action script, comprising a set of commands corresponding to the input, the action script being executable at a backend, wherein the backend comprises a user interface of the second application;

executing, at the backend, at least one action script based on the mapping at the controller; and receiving, at the controller, field values and messages displayed at the backend; and determining, by applying a set of ambistateful criteria at the controller, whether to place the backend under stateless control or stateful control, upon completion of execution of the at least one action script.

18. The computer-readable media according to claim 17, wherein the method further comprises switching dynamically between stateful control or stateless control of the backend.

19. The computer-readable media according to claim 17, wherein if a data change is detected in a persistency layer the backend can only remain under stateful control.

20. A computer-implemented method for controlling a backend, comprising:

executing, at the backend by a processor, at least one command; and determining, by applying a set of ambistateful criteria, whether to place the backend under stateless control or stateful control, upon completion of execution of at least one command.

21. The method according to claim 20, further comprising switching dynamically between stateful control or stateless control of the backend.

22. The method according to claim 20, wherein if a data change is detected in a persistency layer, the backend remains under stateful control.

23. A system for controlling a backend, comprising:

a processor;

a backend for executing, by the processor, at least one command; and a controller for determining, by applying a set of ambistateful criteria, whether to place the backend under stateful control or stateless control, upon completion of execution of at least one action script.

24. The system according to claim 23, further comprising switching dynamically between stateful control or stateless control of the backend.

25. The method according to claim 23, wherein if a data change is detected in a persistency layer, the backend remains under stateful control.

* * * * *